United States Patent [19]

Brown et al.

[11] 4,325,868

[45] Apr. 20, 1982

[54] PROCESS FOR PRODUCING A PROTEINACEOUS MATERIAL HAVING A HIGH WATER HOLDING CAPACITY AND THE MATERIAL PRODUCED THEREBY

[75] Inventors: Charles R. T. Brown, Oakley; Peter Harris, Bolnhurst, both of England

[73] Assignee: Lever Brothers Company, New York, N.Y.

[21] Appl. No.: 237,212

[22] Filed: Feb. 23, 1981

[30] Foreign Application Priority Data

Feb. 28, 1980 [GB] United Kingdom ............... 06807/80

[51] Int. Cl.³ ................................................. A23J 1/14
[52] U.S. Cl. .................................... 260/123.5; 426/656
[58] Field of Search ....................... 426/656; 260/123.5

[56] References Cited

U.S. PATENT DOCUMENTS

| | | | |
|---|---|---|---|
| 3,001,875 | 9/1961 | Sair | 426/656 |
| 3,622,556 | 11/1971 | O'Connor | 426/656 X |
| 3,853,839 | 12/1974 | Magnino et al. | 426/656 X |
| 3,885,052 | 5/1975 | Starr | 426/656 X |
| 4,293,571 | 10/1981 | Olofsson et al. | 426/656 X |

*Primary Examiner*—Robert A. Yoncoskie
*Attorney, Agent, or Firm*—Melvin H. Kurtz

[57] ABSTRACT

A defatted meal originating from oil-bearing seeds such as soybean, rapeseed or cottonseed is treated with an acidic aqueous solution to solubilize protein present in the meal. If desired any insoluble carbohydrates present can be removed. The pH of the resulting slurry or clarified solution is lowered to between 2.0 and 3.0 and maintained to dissociate the protein into its subunits. The slurry or clarified solution is heated to cause aggregation of the subunits and its pH is then raised prior to ultra-filtration. A membrane is employed which retains the proteinaceous material and yet allows salts and low molecular sugar to permeate.

14 Claims, No Drawings

PROCESS FOR PRODUCING A PROTEINACEOUS MATERIAL HAVING A HIGH WATER HOLDING CAPACITY AND THE MATERIAL PRODUCED THEREBY

The invention relates to a process for producing a proteinaceous material having a high water-holding capacity, by which term is meant that the degree of water uptake of the material when contacted in water or aqueous solutions is high, and to the material produced thereby.

Proteinaceous products having a high water-holding capacity (WHC) are required for example for assisting the stabilisation of emulsions (containing fat and water) by imparting a high viscosity to the aqueous phase, thus preventing coalescence of fat droplets. Fat emulsions are used for instance in simulated meat formulations, in the manufacture of sausages, pate and the like.

It is an object of the present invention to provide an economical process for producing said proteinaceous material.

The process according to the present invention involves:

(a) treating a defatted meal originating from oil-bearing seeds with an aqueous solution having a pH in the range of from 6.0 to 9.0 for a period of time sufficient to solubilise at least a portion of the protein present in the meal;

(b) lowering the pH of the product of step (a) to a value in the range of from 2.0 to 3.0 and maintaining the said pH within said range until a substantial portion of the said protein is dissociated into a variety of subunits;

(c) heating the product of step (b) at a temperature in the range of from 80° to 100° C. so as to aggregate said subunits and obtain a protein-containing material which is insoluble in water;

(d) bringing the pH of the product of step (c) to fall within the range of from 6.0 to 8.0; and (e) subjecting the product of step (d) to ultra filtration on a membrane having a cut-off limit such that the proteinaceous material is retained whilst salts and low molecular sugars permeate.

The meal used in step (a) may for example originate from a member selected from the group consisting of rapeseed, soybeans, cottonseed and the like. The defatted meals used may be obtained by extracting the meals with an organic solvent such as hexane. In the present process defatted soymeal is preferably used.

The preferred proportions of water to meal can be assessed in each particular instance and can in most cases suitably be 5 to 10 parts of water or aqueous solution to 1 part of meal.

The pH of the aqueous solution used to treat the defatted meal preferably has a value within the range of from 8.0 to 9.0.

Extraction of the defatted meal with the aqueous soltion for a period of time ranging from 30 min. to 60 min. has been found to be adequate in most cases. In the case where a proteinaceous product is required which is partially or substantially free from insoluble carbohydrates, the carbohydrates can be removed e.g. by decantation or centrifugation, before performing the acidification step (b). If insoluble carbohydrates are retained the product of step (a) is in the form of a slurry, if they are substantially removed the product of step (a) is in the form of a clarified solution.

The pH of the slurry or the clarified solution is preferably lowered to a value in the range of from 2.3 to 2.7 and ideally to 2.5. The pH should not be lowered to a value below 2.0, since hydrolysis of the protein may occur. At a pH greater than 3.0 insufficient dissociation of the protein into subunits may take place and the flux rate in step (e) can be inadequate.

The slurry or the clarified solution is kept within the said pH range for preferably 1 to 30 minutes.

Any edible acid, for example HCl, $H_2SO_4$ or $HNO_3$, can be used to lower the pH. It has however been found that HCl can be particularly useful since the WHC of the end-product and the flux rate during ultra-filtration in a process employing HCl can be optimal.

The temperature applied in step (c) preferably lies in the range of from 90° to 98° C. The duration of heating is such as to ensure that the protein is denatured to such an extent that it becomes water-insoluble.

Before applying ultra-filtration the pH of the slurry or the clarified solution is raised to preferably 6.5 to 7.5 and ideally to 7.0.

The choice of the ultra-filtration membrane should preferably be such that salts and low molecular weight water-soluble sugars permeate, whereas the protein under consideration is retained on the membrane. In most instances a membrane having a molecular cut-off limit greater than 10.000 Daltons can be adequate.

Ultra-filtration is preferably carried out at a temperature in the range of from 50° to 60° C. Within this range the flux rate can be optimal and the growth of microorganisms can be kept at a minimum without impairing the quality of the protein. The invention will now be illustrated in the following Example:

EXAMPLE 1

A slurry consisting of 1 part defatted soymeal and 10 parts by weight of an aqueous solution at pH 9 was prepared and stirred for 30 min. The pH was then lowered to 7.0 and the insoluble carbohydrates were centrifuged-off.

The pH of the clarified solution was then adjusted to 2.5 with hydrochloric acid. The acidified solution was then heated for 10 min. at 95° C. and subsequently cooled to 50° C. The pH was then raised to 7.0 and the solution was ultra-filtered on a membrane having a molecular cut-off limit greater than 10.000.

The initial flux rate was 95 $l/m^2$/hour.

Comparative Example (A)

The procedure of Example 1 was repeated, except that the sequence of steps (b) and (c) was reversed.

The initial flux rate was 20 $l/m^2$/hour.

Comparative Example (B)

The procedure of Example 1 was repeated, except that acidification was performed at pH 3.5.

The initial flux rate was 17 $l/m^2$/hour.

Comparative Example (C)

The procedure of Example 1 was repeated, except that the sequence of steps (b) and (c) were reversed and that acidification was performed at pH 3.5.

The initial flux rate was 21 $l/m^2$/hour.

The above Examples show the criticality of the pH-range used in step (b) and the order in which the steps are carried out.

The water-holding capacity of the product obtained according to Example 1 was measured indirectly by measuring the apparent viscosity of aqueous dispersions of the product. The procedure was as follows:

An aqueous dispersion (20 wt. % soy protein obtained according to the process of Example 1) containing 2% sodium chloride was produced under vacuum.

A small proportion of the dispersion was placed upon the load cell of an Instron Universal Testing machine to cause extrusion of the dispersion from between the surfaces of the load cell and a plunger, driven at constant speed. Forces necessary to maintain a fixed rate of deformation, corresponding to a fixed, small separation of plunger and load cell (0.1 mm), were recorded. Plunger speed was 50 cm/min. and its diameter was 25 mm. At a rate of deformation corresponding to 0.1 mm sample height, the following values were obtained which illustrate isolate water-holding capacity.

|  | Force in Newton |
|---|---|
| Isolated produced according to Example 1 | 118 ± 11 |
| Ralston Purina 500 E (a commercially available product) | 45 ± 6 |

A high value corresponds to a high WHC.

We claim:
1. A process for producing a proteinaceous material having a high water-holding capacity comprising the steps of:
   (a) treating a defatted meal originating from oil-bearing seeds with an aqueous solution having a pH in the range of from 6.0 to 9.0 for a period of time sufficient to solubilise at least a portion of the protein present in the meal;
   (b) lowering the pH of the product of step (a) to a value in the range of from 2.0 to 3.0 and maintaining the said pH within said range until a substantial portion of the said protein is dissociated into a variety of subunits;
   (c) heating the product of step (b) at a temperature in the range of from 80° to 100° C. so as to aggregate said subunits and obtain a protein-containing material which is insoluble in water;
   (d) bringing the pH of the product of step (c) to fall within the range of from 6.0 to 8.0; and
   (e) subjecting the product of step (d) to ultra-filtration on a membrane having a cut-off limit such that the proteinaceous material is retained whilst salts and low molecular sugars permeate.

2. A process according to claim 1 wherein step (a) includes the additional step of removing at least a portion of any insoluble carbohydrates present.

3. A process according to claim 1 or claim 2 wherein the defatted meal originates from a member selected from the group consisting of rapeseed, soybeans, cottonseed and a mixture of at least two thereof.

4. A process according to claim 1 or claim 2 wherein in step (a) one part of defatted meal is treated with from five to ten parts of the aqueous solution.

5. A process according to claim 1 or claim 2 wherein in step (a) the defatted meal is treated with the said aqueous solution for a period of time of from 30 to 60 minutes.

6. A process according to claim 1 wherein in the step (b) the pH is lowered to a value in the range of from 2.3 to 2.7.

7. A process according to claim 6 wherein the said pH is lowered to a value of 2.5.

8. A process according to claim 6 or claim 7 wherein in step (b) the said pH is maintained for from 1 to 30 minutes.

9. A process according to claim 6 or claim 7 wherein hydrochloric acid is used to lower the pH.

10. A process according to claim 1 or claim 2 wherein in step (c) the temperature is from 90° to 98° C.

11. A process according to claim 1 wherein in step (d) the pH is brought to a value within the range of from 6.5 to 7.5.

12. A process according to claim 11 wherein the pH is brought to a value of 7.0.

13. A process according to claim 1 or claim 2 wherein the ultra-filtration is carried at a temperature in the range of from 50° to 60° C.

14. A proteinaceous material having a high water-holding capacity the material being produced by a process in accordance with claim 1.

* * * * *